(12) United States Patent
Lee et al.

(10) Patent No.: US 7,234,391 B2
(45) Date of Patent: Jun. 26, 2007

(54) BREAD MAKER

(75) Inventors: Tae-uk Lee, Suwon (KR); Jong-wook Lee, Yongin (KR); Han-jun Sung, Suwon (KR); Jae-ryong Park, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 599 days.

(21) Appl. No.: 10/360,727

(22) Filed: Feb. 10, 2003

(65) Prior Publication Data

US 2004/0011211 A1 Jan. 22, 2004

(30) Foreign Application Priority Data

Jul. 19, 2002 (KR) ................. 2002-42591

(51) Int. Cl.
*A47J 37/01* (2006.01)

(52) U.S. Cl. ............... 99/348; 99/349; 99/334

(58) Field of Classification Search ............. 99/348, 99/349, 467, 334; 366/240, 219, 149
See application file for complete search history.

(56) References Cited

U.S. PATENT DOCUMENTS

| | | | |
|---|---|---|---|
| 2,576,337 A | 11/1951 | Farkas | |
| 2,691,435 A | 10/1954 | Klamp | |
| 3,687,251 A | 8/1972 | Hoerner | |
| 4,550,654 A | 11/1985 | Hedenberg | |
| 4,803,086 A | 2/1989 | Hedenberg | |
| 5,044,022 A * | 9/1991 | Hess | ............... 4/502 |
| 5,234,705 A * | 8/1993 | Mani | ............... 426/496 |
| 5,947,009 A | 9/1999 | Hedenberg | |
| 6,523,208 B1 * | 2/2003 | Muscato et al. | ............... 15/3 |

FOREIGN PATENT DOCUMENTS

| | | |
|---|---|---|
| JP | 64-500320 | 2/1989 |
| JP | 2001-523444 | 11/2001 |
| KR | 1991-6047 | 8/1991 |
| KR | 20-195439 | 6/2000 |
| KR | 2001-32188 | 4/2001 |
| KR | 2001-87500 | 9/2001 |
| WO | WO 87/03784 | 7/1987 |

OTHER PUBLICATIONS

Office Action issued by Japanese Patent Office on Nov. 30, 2004.
Second Office Action issued on Jun. 17, 2005 by the State Intellectual Property Office of People's Republic of China (SIPO).

* cited by examiner

*Primary Examiner*—Reginald L. Alexander
(74) *Attorney, Agent, or Firm*—Staas & Halsey LLP

(57) ABSTRACT

A bread maker including an oven compartment, parallel kneading drums inside the oven compartment that alternate between winding and unwinding rotations, and a drum driving part rotating the kneading drums. Each kneading drum includes a rotation shaft rotating according to the drum driving part; a hollow, cylindrical drum member disposed concentrically along an axis of the rotation shaft; and a clutch between the rotation shaft and the drum member, transmitting a rotary movement from the rotation shaft to the drum member in one direction and allowing the drum member to freewheel in the other direction.

23 Claims, 6 Drawing Sheets

BREAD MAKER

CROSS-REFERENCE TO RELATED APPLICATIONS

This application claims the benefit of Korean Application No. 2002-42591, filed Jul. 19, 2002, in the Korean Intellectual Property Office, the disclosure of which is incorporated herein by reference.

BACKGROUND OF THE INVENTION

1. Field of the Invention

The present invention relates to a bread maker, and more particularly, to a bread maker with an improved rotation structure between kneading drums.

2. Description of the Related Art

Generally, making bread is so complicated that it is difficult for an average person to manually make satisfactory bread at home. That is, making the bread is complicated because multiple steps are involved including mixing raw materials such as flour, sugar, baking powder, etc. to form a dough; kneading the dough; leavening the dough; baking the dough; and so on.

Therefore, a bread maker has been developed that allows a user to easily make bread. The bread maker automatically performs the foregoing multiple steps and provides finished bread to the user.

As shown in FIGS. 1 and 2, a conventional bread maker includes a main body 100 divided into an oven compartment 110 and an electric component compartment 130, a door 300 in the front of the main body 100 to open and close the oven compartment 110, and a control panel (not shown) provided in the front of the electric component compartment 130 to allow a user to control the bread maker.

Inside the oven compartment 110, upper and lower kneading drums 150 and 170 are provided in parallel. The upper and lower kneading drums 150 and 170 have a plurality of projections 157 and 177 that engage a plurality of holes in upper and lower ends of a bag (not shown) filled with raw materials ingredients for preparing the bread. The projections 150 and 170 engage the holes in the bag to wind the bag in clockwise and counterclockwise directions. The upper and lower kneading drums 150 and 170 are rotatably connected to upper and lower opposite inner-walls of the main body 100 using respective bearings 111.

Between the upper and lower kneading drums 150 and 170 is provided a baking tray 113 in which the dough is contained for baking. On the inside walls of the main body 100 and the door 300 are respective heaters 115 for heating the baking tray 113.

Beside the oven compartment 110 is the electric component compartment 130. Inside the electric component compartment 130 are a drum driving part 133, including a motor 133b incorporated with a gear reducer 133a to rotate the lower kneading drum 170 in clockwise and counterclockwise directions, and a belt 135 connecting the upper and lower kneading drums 150 and 170 to transmit a rotary movement from the lower kneading drum 170 to the upper kneading drum 150. The drum driving part 133 and the lower kneading drum 170 are connected by a coupler 131.

With the conventional configuration, the process of setting up the bag on the upper and lower kneading drums 150 and 170 is performed as follows.

First, the holes provided in the upper end of the bag engage with the projections 157 of the upper kneading drum 150, and then the bag is wound on the upper kneading drum 150 by rotating the drum driving part 133. At this time, the bag is wound only enough to place the lower end of the bag at the projections 177 of the lower kneading drum 170. Then, the holes provided in the lower end of the bag engage with the projections 177 of the lower kneading drum 170, thereby completing the setting up process.

However, in the conventional bread maker, because the upper and lower kneading drums 150 and 170 are mechanically bound with the drum driving part 133, the projections 157 of the upper kneading drum 150 are rotated depending upon the rotary movement of the projections 177 of the lower kneading drum 170. Hence, if the holes provided in the lower end of the bag deviate from the projections 177 of the lower kneading drum 170 because, for example, the bag is not wound sufficiently to place the lower end of the bag at the projections 177 of the lower kneading drum 170, the user must restart the setting up process.

Further, in the conventional bread maker, the drum driving part 133 must be operated to remove the bag from the bread maker, which increases electric power consumption.

SUMMARY OF THE INVENTION

It is an object of the present invention to provide a bread maker in which a mixing bag may be easily installed and removed.

Additional objects and advantages of the invention will be set forth in part in the description that followed, and, in part, will be obvious from the description, or may be learned by practice of the invention.

To achieve the above and other objects according to an embodiment of the present invention, there is provided a bread maker including an oven compartment, parallel kneading drums inside the oven compartment that alternate between winding and unwinding rotations, and a drum driving part rotating the kneading drums. Each kneading drum includes a rotation shaft rotating according to the drum driving part; a drum member disposed concentrically along an axis of the rotation shaft; and a clutch between the rotation shaft and the drum member, transmitting a rotary movement from the rotation shaft to the drum member in one direction and allowing the drum member to freewheel in the other direction.

The drum member is a cylinder in which the rotation shaft is accommodated.

To achieve the above and other objects according to another embodiment of the present invention, there is provided a bread maker including an oven compartment, parallel kneading drums inside the oven compartment that alternate between winding and unwinding rotations, and a drum driving part rotating the kneading drums. Each kneading drum includes a solid cylindrical drum member; a rotation shaft accommodated by the drum member and rotated by the drum driving part; and a clutch connecting the rotation shaft and the drum member, the clutch transmitting a rotary movement from the rotation shaft to the drum member in one direction and allowing the drum member to freewheel in the other direction.

To achieve the above and other objects according to another embodiment of the present invention, there is provided a kneading drum apparatus for a bread maker, including an upper kneading drum and a lower kneading drum; a rotation shaft in the upper kneading drum and the lower kneading drum; a hollow, cylindrical drum member disposed concentrically around each rotation shaft; a drum driving part rotating one of the upper kneading drum and the lower kneading drum; a belt connecting the rotation shafts of the upper kneading drum and the lower kneading drum and transmitting a rotary movement from the kneading drum rotated by the drum driving part to the other kneading drum; and a clutch connecting the rotation shaft to the drum member in the upper kneading drum and the lower kneading drum. The clutch transmits the rotary movement from the rotation shaft to the drum member in one direction and allows the drum member to freewheel in the other direction.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other objects and advantages of the present invention will become apparent and more readily appreciated from the following description of the embodiments, taken in conjunction with the accompany drawings, of which.

DETAILED DESCRIPTION OF THE PREFERRED EMBODIMENT

Figure 1:
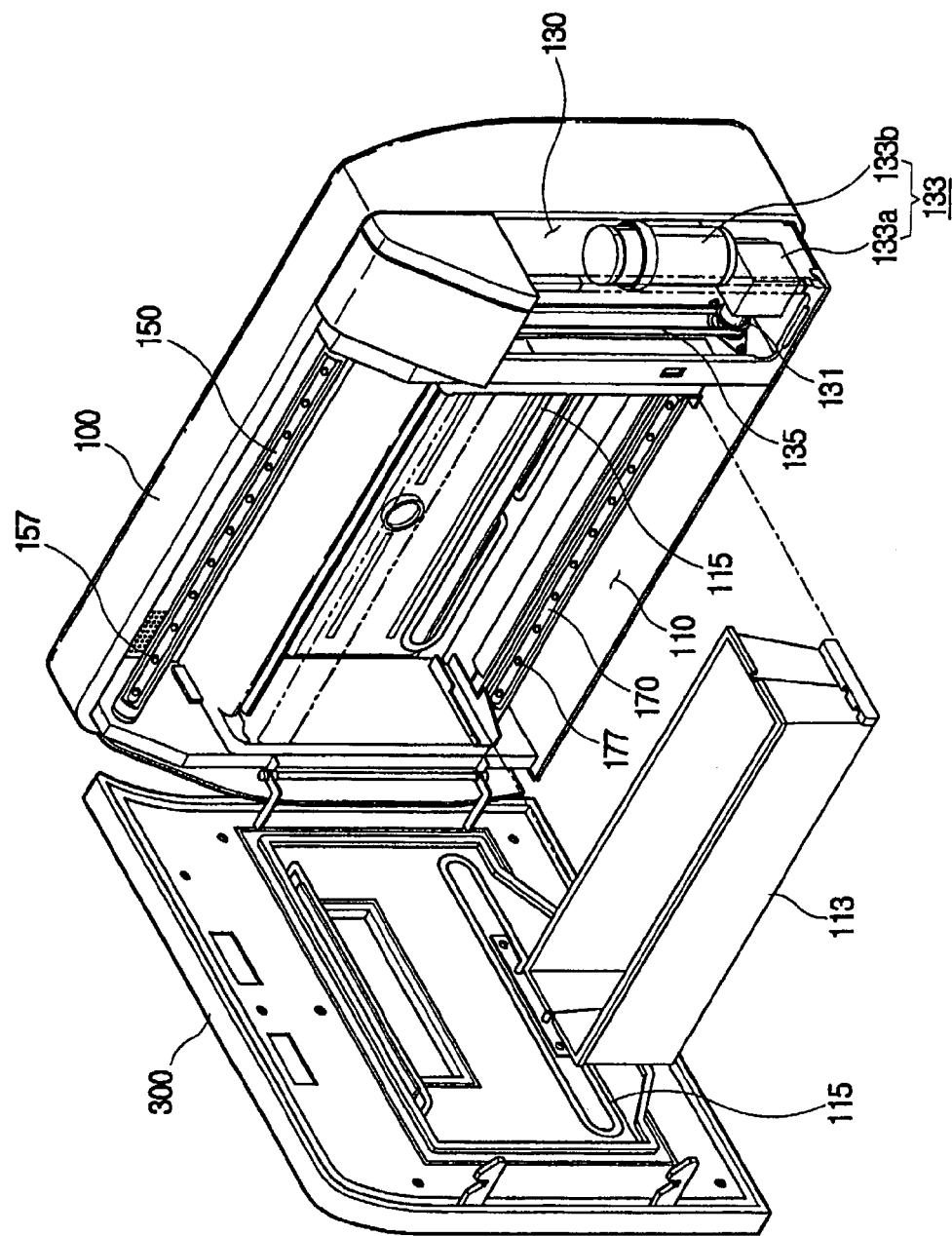
FIG. 1 is a perspective view of a conventional bread maker.
Figure 2:
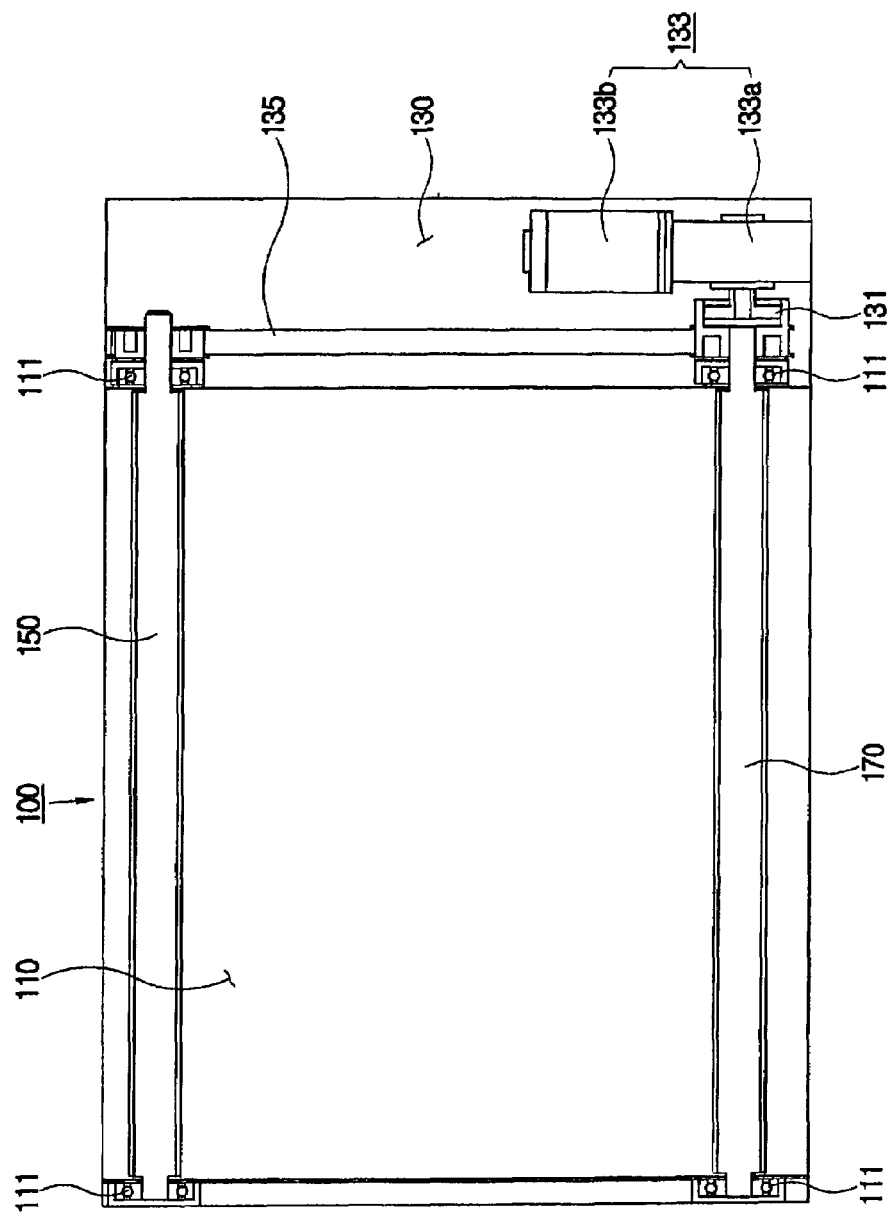
FIG. 2 is a front sectional view schematically illustrating the conventional bread maker of FIG. 1.

Hereinafter, embodiments of the present invention will be described in detail with reference to the attached drawings, wherein the like reference numerals refer to the like elements throughout. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 3:
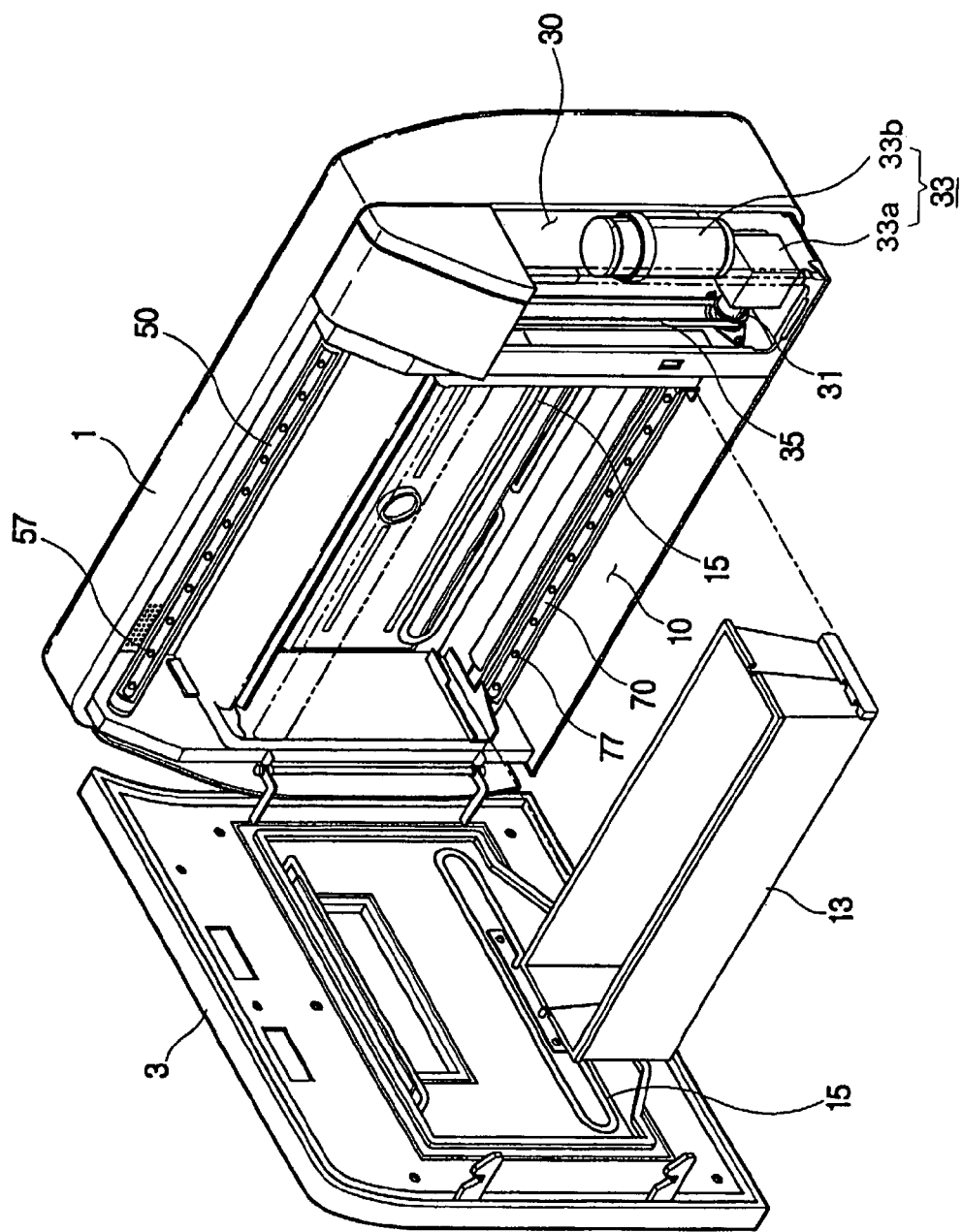
FIG. 3 is a perspective view of a bread maker according to a first embodiment of the present invention.

As shown in FIG. 3, a bread maker according to a first embodiment of the present invention includes a main body 1 divided into an oven compartment 10 and an electric component compartment 30, a door 3 in the front of the main body 1 to open and close the oven compartment 10, and a control panel (not shown) in the front of the electric component compartment 30 to allow a user to control the bread maker.

Figure 4:
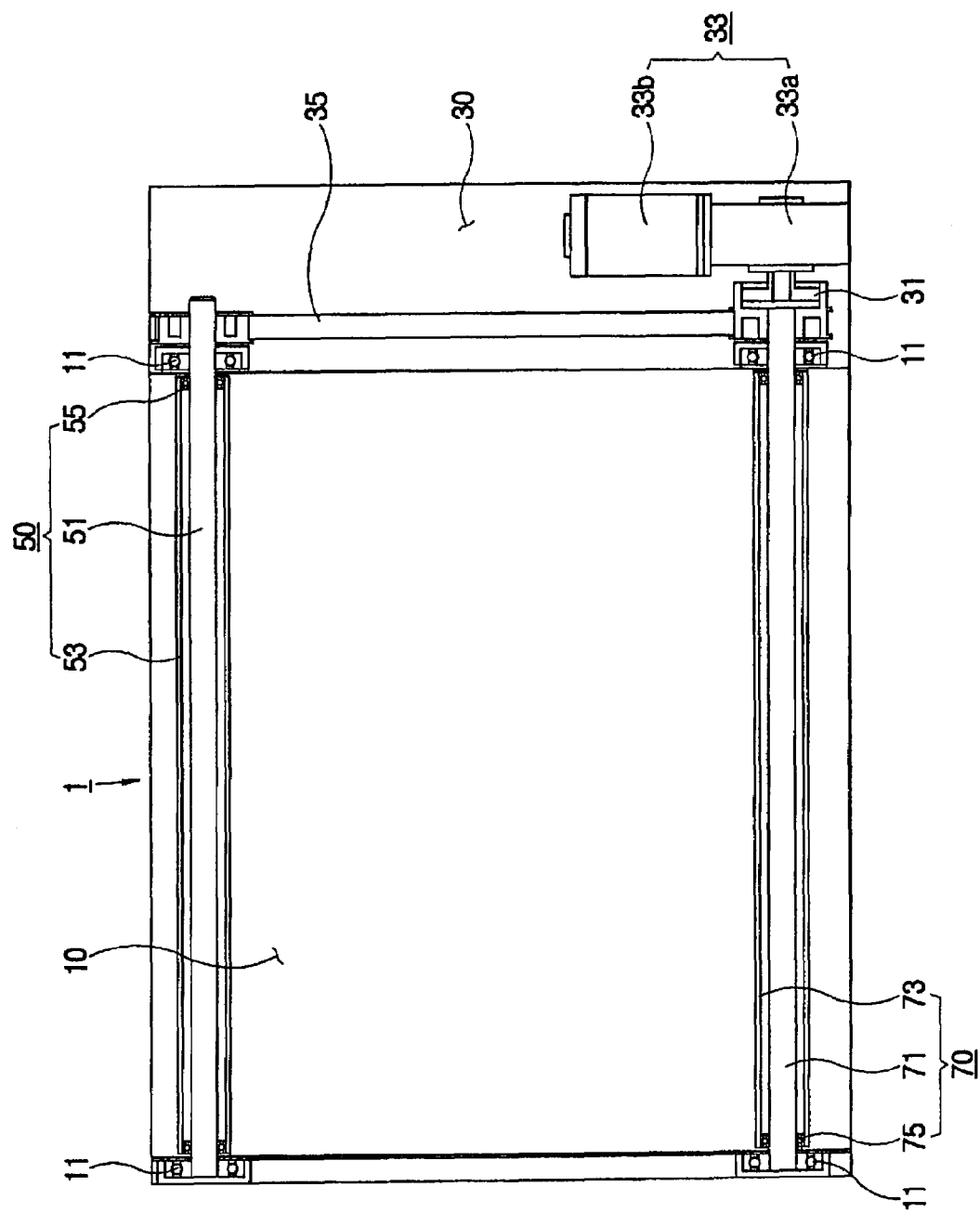
FIG. 4 is a front sectional view schematically illustrating the bread maker of FIG. 3.

Inside the oven compartment 10, upper and lower kneading drums 50 and 70 are provided in parallel and engage a bag (not shown) filled with raw materials for preparing the bread by winding the bag in clockwise and counterclockwise directions. The upper and lower kneading drums 50 and 70 are rotatably connected to upper and lower opposite innerwalls of the main body 1 using respective bearings 11 (FIG. 4). The upper and lower kneading drums 50 and 70 are rotated by a drum driving part 33 (described below), which winds the bag on and off the upper and lower kneading drums 50 and 70, thereby kneading the dough in the bag.

Between the upper and lower kneading drums 50 and 70 is a baking tray 13 in which the dough is contained for baking. On the inside walls of the main body 1 and the door 3 are respective heaters 15 for heating the baking tray 13.

Beside the oven compartment 10 is the electric component compartment 30. Inside the electric component compartment 30 is the drum driving part 33, including a motor 33b incorporated with a gear reducer 33a to rotate the lower kneading drum 70 in clockwise and counterclockwise directions. The drum driving part 33 is connected to one side of the lower kneading drum 70 by a coupler 31.

Figure 5:
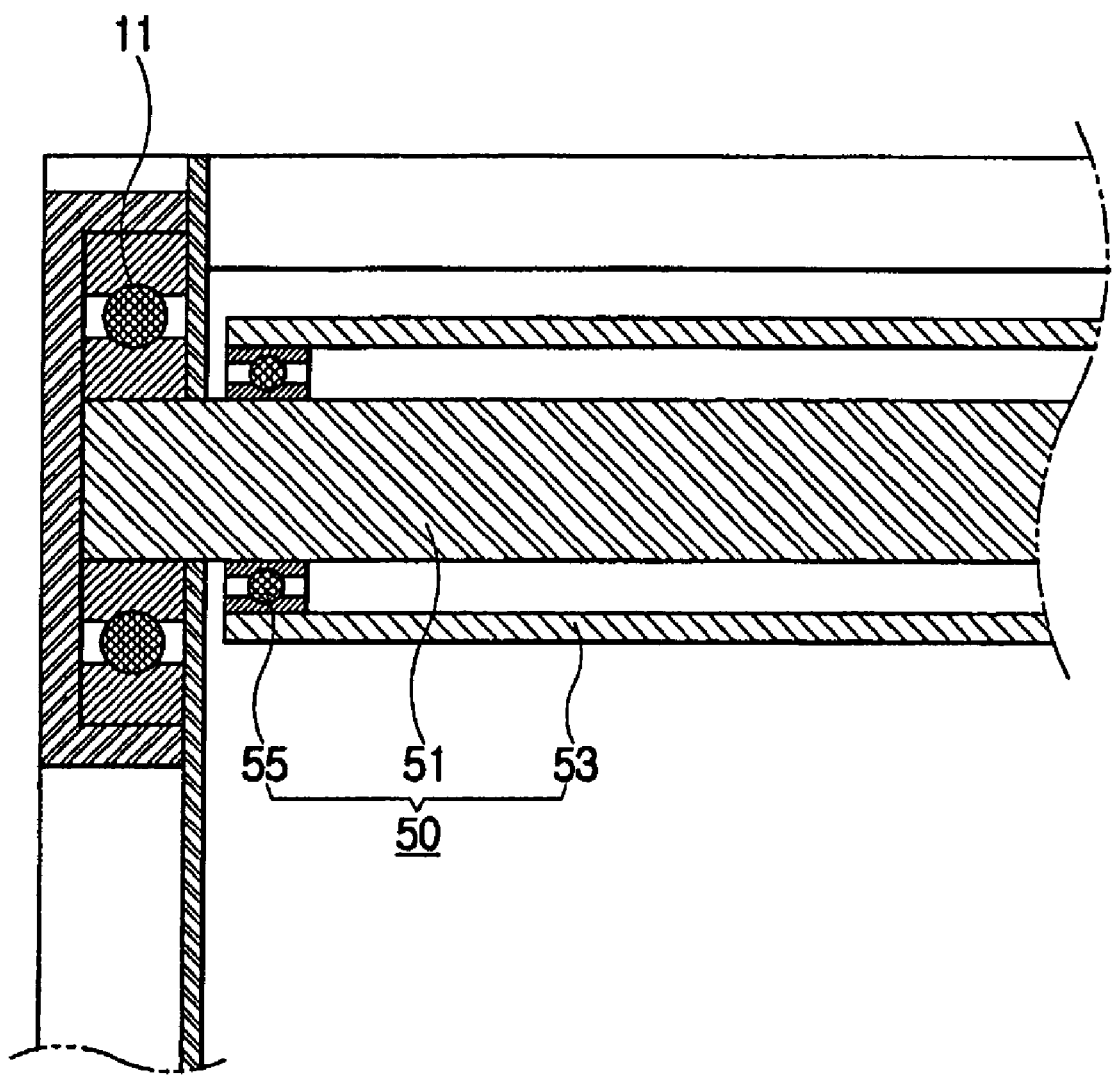
FIG. 5 is an enlarged sectional view partially illustrating the bread maker of FIG. 4.

Referring to FIGS. 4 and 5, the upper and lower kneading drums 50 and 70 both include respective rotation shafts 51 and 71 that are rotated by the drum driving part 33, respective drum members 53 and 73 that lay concentrically along the axis of the respective rotation shafts 51 and 71, and respective clutches 55 and 75 that are placed between the rotation shafts 51 and 71 and the drum members 53 and 73. The clutches 55 and 75 connect the rotation shafts 51 and 71 with the drum members 53 and 73 when the bag is wound on the upper and lower kneading drums 50 and 70, and disconnect the rotation shafts 51 and 71 from the drum members 53 and 73 when the bag is wound off the upper and lower kneading drums 50 and 70.

The rotation shaft 71 of the lower kneading drum 70 is connected to the drum driving part 33 of the electric component compartment 30 by the coupler 31 and is rotated by the drum driving part 33, alternating between a winding direction and an unwinding direction. Further, the rotation shaft 71 of the lower kneading drum 70 is connected to the rotation shaft 51 of the upper kneading drum 50 by a belt 35, so that a rotational force (or rotary movement) is transmitted from the lower rotation shaft 71 to the upper rotation shaft 51.

The upper and lower drum members 53 and 73 are hollow cylinders and respectively accommodate the upper and lower rotation shafts 51 and 71, forming an outer portion of the upper and lower kneading drums 50 and 70. The upper and lower drum members 53 and 73 have a plurality of respective projections 57 and 77 at regular intervals, and the plurality of projections 57 and 77 engage the holes of the upper and lower ends of the bag.

The clutches 55 and 75 are placed between the rotation shafts 51 and 71 and the drum members 53 and 73, and allow the drum members 53 and 73 to freewheel relative to the rotation shafts 51 and 71 in one direction only. Hence, the clutches 55 and 75 allow the drum members 53 and 73 to freewheel relative to the rotation shafts 51 and 71 when the bag is wound on the drum members 53 and 73, but prevent the drum members 53 and 73 from freewheeling relative to the rotation shafts 51 and 71 when the bag is wound off the drum members 53 and 73.

In the bread maker according to the present invention, the processes of setting up, kneading, and removing the bag are performed as follows.

First, the holes in the upper end of the bag filled with raw materials for the bread engage the projections 57 in the drum member 53 of the upper kneading drum 50. Thereafter, the upper kneading drum 50 rotates so that the bag is wound on the upper kneading drum 50. The drum member 53 of the upper kneading drum 50 may be manually rotated relative to the rotation shaft 51 without operating the drum driving part 33, thereby decreasing electric power consumption.

When the bag is wound enough to place the lower end of the bag at the projections 77 of the lower kneading drum 70, the holes provided in the lower end of the bag engage the projections 77 provided in the drum member 73 of the lower kneading drum 70. At this time, even if the holes provided in the lower end of the bag deviate from the projections 77 of the lower kneading drum 70, the holes of the bag may engage the projections 77 of the lower kneading drum 70 by properly rotating the drum member 73 in the winding direction.

After the bag is completely set up, the drum driving part 33 rotates the upper and lower rotation shafts 51 and 71. At this time, when the lower rotation shaft 71 is rotated in the winding direction, the upper rotation shaft 51 is rotated in the unwinding direction, and vice versa.

That is, when the lower rotation shaft 71 rotates in the winding direction, the lower drum member 73 rotates with the lower rotation shaft 71, with the lower end of the bag being wound thereon. Simultaneously, when the upper rotation shaft 51 rotates in the unwinding direction by cooperating with the lower rotation shaft 71, the upper drum member 53 rotates in the unwinding direction independently of the upper rotation shaft 51 because the lower drum member 73 pulls the bag down while rotating. On the other hand, when the upper rotation shaft 51 rotates in the winding direction, the upper and lower drum members 53 and 73 operate in reverse directions.

Figure 6:
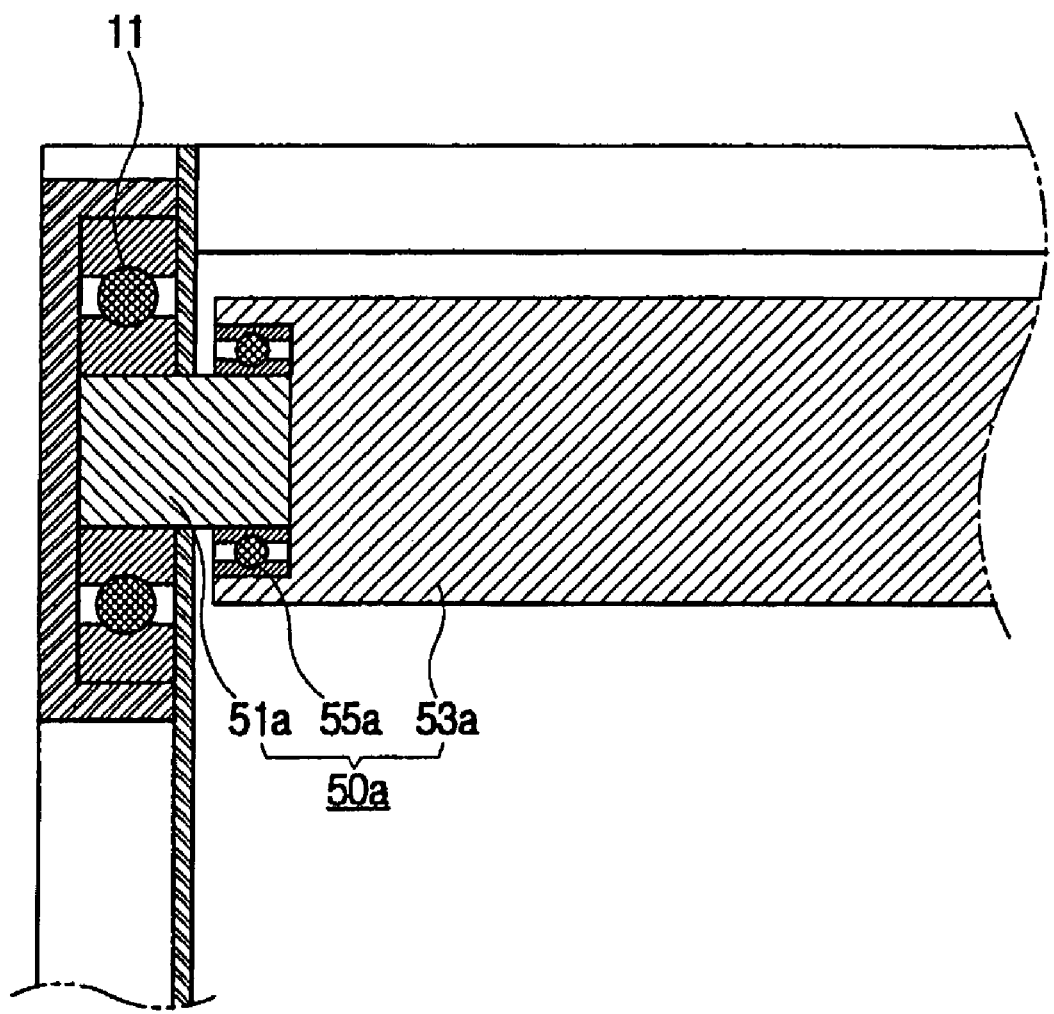
FIG. 6 is an enlarged sectional view partially illustrating a bread maker according to a second embodiment of the present invention.

According to a second embodiment of the present invention, as shown in FIG. 6, the upper drum member 53a of the upper kneading drum 50a, as well as the lower drum member of the lower kneading drum (not shown), is a solid cylinder, in contrast to the drum members 53 and 73 according to the first embodiment of the present invention, in which the drum members 53 and 73 are hollow cylinders through which the long rotation shafts 51 and 71 pass, respectively. Thus, according to the second embodiment, short rotation shafts 51a are provided on opposite inner walls of the upper and lower parts of the oven compartment 10, respectively. Further, the drum member 53a and the rotation shaft 51a are connected by a clutch 55a placed between the drum member 53a and the rotation shaft 51a.

In the foregoing embodiments, the clutches 55, 75, and 55a are provided at opposite ends of the upper and lower kneading drums 50, 70, and 50a. However, the clutches 55, 75, and 55a may be provided at one end of the upper and lower kneading drums 50, 70, and 50a, to which a rotary movement of the drum driving part 33 is first transmitted.

As described above, the upper and lower kneading drums 50, 70, and 50a include the upper and lower rotation shafts 51, 71, and 51a that rotate according to the drum driving part 33, and the upper and lower drum members 53, 73, and 53a freewheel relative to the upper and lower rotation shafts 51, 71, and 51a in one direction only, so that the bag can be easily set up and removed from the upper and lower kneading drums 50, 70, and 50a.

Further, the bag may be manually set up and removed from the upper and lower kneading drums 50, 70, and 50a, thereby decreasing electric power consumption.

As described above, the present invention provides a bread maker in which upper and lower drum members 50, 70, and 50a may freewheel, so that a bag can be easily set up and removed.

Further, the present invention provides a bread maker in which a bag may be manually set up and removed, thereby decreasing electric power consumption Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A bread maker comprising an oven compartment, parallel kneading drums inside the oven compartment that alternate between winding and unwinding rotations, and a drum driving part rotating the kneading drums, each kneading drum comprising:
 a rotation shaft rotating according to the drum driving part;
 a drum member disposed concentrically along an axis of the rotation shaft; and
 a clutch between the rotation shaft and the drum member, transmitting a rotary movement from the rotation shaft to the drum member in one direction and allowing the drum member to freewheel in the other direction,
 wherein the drum members have a plurality of projections and a bag filled with bread dough is attached to the projections and wound on and off the kneading drums using the driving part, thereby kneading the dough in the bag, and
 wherein, for each kneading drum, the clutch connects the rotation shaft with the drum member when the bag is wound on the kneading drum, and disconnects the rotation shaft from the drum member when the bag is wound off the kneading drum.

2. The bread maker according to claim 1, wherein the drum member is a cylinder in which the rotation shaft is accommodated.

3. The bread maker according to claim 1, wherein the kneading drums are rotatably connected to upper and lower opposite inner-walls of a main body using respective bearings.

4. The bread maker according to claim 1, further comprising a belt connecting the rotation shafts of the kneading drums to transmit a rotary movement between the kneading drums.

5. The bread maker of claim 1, wherein the drum members are hollow cylinders and the rotation shafts are longer than the drum members and pass through the respective hollow drum members, the drum members forming an outer portion of the respective kneading drums.

6. The bread maker according to claim 1, wherein the clutches are located at opposite ends of the kneading drums.

7. The bread maker according to claim 1, wherein the clutches are located at an end of the kneading drums to which the rotary movement is applied.

8. The bread maker according to claim 1, wherein, for each kneading drum, the clutch allows the drum member to freewheel relative to the rotation shaft when the bag is wound on the drum member, but prevents the drum member from freewheeling relative to the rotation shaft when the bag is wound off the drum member.

9. The bread maker according claim 1, wherein the kneading drums include an upper kneading drum and a lower kneading drum and holes in an upper end of the bag engage the projections in the drum member of the upper kneading drum, and the upper kneading drum is rotated sufficiently to wind the bag on the upper kneading drum and position holes in a lower end of the bag at the projections of the drum member of the lower kneading drum.

10. The bread maker according to claim 9, wherein the drum driving part alternately rotates the rotation shafts, with the rotation shaft of the lower kneading drum rotating in a winding direction and the rotation shaft of the upper kneading drum rotating in an unwinding direction, and vice versa.

11. The bread maker according to claim 9, wherein when the rotation shaft of the lower kneading drum rotates in a winding direction, the respective drum member rotates with the rotation shaft of the lower kneading drum to wind the lower end of the bag on the lower kneading drum, while, simultaneously, the rotation shaft of the upper kneading drum rotates in an unwinding direction and the respective drum member rotates independently of the rotation shaft of the upper kneading drum as the drum member of the lower kneading drum pulls down the bag, and vice versa.

12. The bread maker according to claim 9, wherein the drum members of the kneading drums are manually rotated relative to the respective rotation shafts without operating the drum driving part to decrease electric power consumption.

13. A bread maker comprising an oven compartment, parallel kneading drums inside the oven compartment that alternate between winding and unwinding rotations, and a drum driving part rotating the kneading drums, each kneading drum comprising:
  a solid cylindrical drum member;
  a rotation shaft accommodated by the drum member and rotated by the drum driving part; and
  a clutch connecting the rotation shaft and the drum member, transmitting a rotary movement from the rotation shaft to the drum member in one direction and allowing the drum member to freewheel in the other direction,
  wherein the drum members are longer than the rotation shafts and the rotation shafts are incorporated into the drum members at ends of the drum members and connected to opposite inner walls of upper and lower parts of the oven compartment, wherein:
  the drum members have a plurality of projections and a bag filled with bread dough is attached to the projections and wound on and off the kneading drums using the driving part, thereby kneading the dough in the bag; and
  for each kneading drum, the clutch connects the rotation shaft with the drum member when the bag is wound on the kneading drum, and disconnects the rotation shaft from the drum member when the bag is wound off the kneading drum.

14. A bread maker comprising an oven compartment, parallel kneading drums inside the oven compartment that alternate between winding and unwinding rotations, and a drum driving part rotating the kneading drums, each kneading drum comprising:
  a solid cylindrical drum member;
  a rotation shaft accommodated by the drum member and rotated by the drum driving part; and
  a clutch connecting the rotation shaft and the drum member, transmitting a rotary movement from the rotation shaft to the drum member in one direction and allowing the drum member to freewheel in the other direction,
  wherein the drum members are longer than the rotation shafts and the rotation shafts are incorporated into the drum members at ends of the drum members and connected to opposite inner walls of upper and lower parts of the oven compartment, wherein:
  the drum members have a plurality of projections and a bag filled with bread dough is attached to the projections and wound on and off the kneading drums using the driving part, thereby kneading the dough in the bag; and
  for each kneading drum, the clutch allows the drum member to freewheel relative to the rotation shaft when the bag is wound on the drum member, but prevents the drum member from freewheeling relative to the rotation shaft when the bag is wound off the drum member.

15. A bread maker comprising an oven compartment, parallel kneading drums inside the oven compartment that alternate between winding and unwinding rotations, and a drum driving part rotating the kneading drums, each kneading drum comprising:
  a solid cylindrical drum member;
  a rotation shaft accommodated by the drum member and rotated by the drum driving part; and
  a clutch connecting the rotation shaft and the drum member, transmitting a rotary movement from the rotation shaft to the drum member in one direction and allowing the drum member to freewheel in the other direction,
  wherein the drum members are longer than the rotation shafts and the rotation shafts are incorporated into the drum members at ends of the drum members and connected to opposite inner walls of upper and lower parts of the oven compartment, wherein:
  the drum members have a plurality of projections and a bag filled with bread dough is attached to the projections and wound on and off the kneading drums using the driving part, thereby kneading the dough in the bag;
  the kneading drums include an upper kneading drum and a lower kneading drum and holes in an upper end of the bag engage the projections in the drum member of the upper kneading drum, and the upper kneading drum is rotated sufficiently to wind the bag on the upper kneading drum and position holes in a lower end of the bag at the projections of the drum member of the lower kneading drum; and
  the drum driving part alternately rotates the rotation shafts, with the rotation shaft of the lower kneading drum rotating in a winding direction and the rotation shaft of the upper kneading drum rotating in an unwinding direction, and vice versa.

16. A bread maker comprising an oven compartment, parallel kneading drums inside the oven compartment that alternate between winding and unwinding rotations, and a drum driving part rotating the kneading drums, each kneading drum comprising:
  a solid cylindrical drum member;
  a rotation shaft accommodated by the drum member and rotated by the drum driving part; and
  a clutch connecting the rotation shaft and the drum member, transmitting a rotary movement from the rotation shaft to the drum member in one direction and allowing the drum member to freewheel in the other direction,
  wherein the drum members are longer than the rotation shafts and the rotation shafts are incorporated into the drum members at ends of the drum members and connected to opposite inner walls of upper and lower parts of the oven compartment, wherein:
  the drum members have a plurality of projections and a bag filled with bread dough is attached to the projections and wound on and off the kneading drums using the driving part, thereby kneading the dough in the bag;
  the kneading drums include an upper kneading drum and a lower kneading drum and holes in an upper end of the bag engage the projections in the drum member of the upper kneading drum, and the upper kneading drum is rotated sufficiently to wind the bag on the upper kneading drum and position holes in a lower end of the bag at the projections of the drum member of the lower kneading drum; and the drum members of the kneading drums are manually rotated relative to the respective rotation shafts without operating the drum driving part to decrease electric power consumption.

17. A kneading drum apparatus for a bread maker, comprising:

an upper kneading drum and a lower kneading drum;

a rotation shaft in the upper kneading drum and the lower kneading drum;

a drum member disposed concentrically around each rotation shaft;

a drum driving part rotating one of the upper kneading drum and the lower kneading drum;

a belt connecting the rotation shafts of the upper kneading drum and the lower kneading drum and transmitting a rotary movement from the kneading drum rotated by the drum driving part to the other kneading drum; and a clutch connecting the rotation shaft to the drum member in the upper kneading drum and the lower kneading drum, the clutch transmitting the rotary movement from the rotation shaft to the drum member in one direction and allowing the drum member to freewheel in the other direction, wherein:

the drum members have a plurality of projections and a bag filled with ingredients for bread is attached to the projections and wound on and off the upper kneading drum and the lower kneading drum; and the clutch connects the rotation shaft with the drum member when the bag is wound on the corresponding upper kneading drum or the lower kneading drum, and disconnects the rotation shaft from the drum member when the bag is wound off the corresponding upper kneading drum or the lower kneading drum.

18. The apparatus according to claim 17, wherein the upper kneading drum and the lower kneading drum are rotatably connected to upper and lower opposite inner-walls of a main body of the bread maker using respective bearings.

19. The apparatus according to claim 17, wherein each drum member is a hollow cylinder accommodating a respective rotation shaft and forming an outer portion of the upper kneading drum and the lower kneading drum.

20. The apparatus of claim 17, wherein the rotation shafts are longer than the drum members and the rotation shafts pass through the hollow drum members.

21. The apparatus according to claim 17, wherein:

the drum members have a plurality of projections and a bag filled with ingredients for bread is attached to the projections and wound on and off the upper kneading drum and the lower kneading drum; and the clutches allow the respective drum members to freewheel relative to the respective rotation shafts when the bag is wound on the drum members, but prevents the respective drum members from freewheeling relative to the rotation shafts when the bag is wound off the respective drum members.

22. The apparatus according to claim 17, wherein:

the drum members have a plurality of projections and a bag filled with ingredients for bread is attached to the projections and wound on and off the upper kneading drum and the lower kneading drum;

holes in an upper end of the bag engage the projections in the drum member of the upper kneading drum, and the upper kneading drum is sufficiently rotated to wind the bag on the upper kneading drum and position holes in a lower end of the bag at the projections of the drum member of the lower kneading drum; and the drum driving part alternately rotates the rotation shafts, with the rotation shaft of the lower kneading drum rotating in a winding direction and the rotation shaft of the upper kneading drum rotating in an unwinding direction, and vice versa.

23. The apparatus according to claim 17, wherein:

the drum members have a plurality of projections and a bag filled with ingredients for bread is attached to the projections and wound on and off the upper kneading drum and the lower kneading drum;

holes in an upper end of the bag engage the projections in the drum member of the upper kneading drum, and the upper kneading drum is sufficiently rotated to wind the bag on the upper kneading drum and position holes in a lower end of the bag at the projections of the drum member of the lower kneading drum; and the drum members of the kneading drums may be manually rotated relative to the respective rotation shafts without operating the drum driving part to decrease electric power consumption.

* * * * *